United States Patent [19]
Lee et al.

[11] Patent Number: 5,326,533
[45] Date of Patent: Jul. 5, 1994

[54] MULTIWELL TEST APPARATUS

[75] Inventors: Carolyn Lee, Sudbury; Donald Rising, Stow; Thomas Zermani, Concord, all of Mass.

[73] Assignee: Millipore Corporation, Bedford, Mass.

[21] Appl. No.: 971,498

[22] Filed: Nov. 4, 1992

[51] Int. Cl.⁵ .................... B01D 27/08; B01D 29/03; C12M 1/12; C12M 1/20
[52] U.S. Cl. ................................... 422/101; 210/455; 210/473; 435/301; 435/311
[58] Field of Search ................ 422/101; 435/301, 311; 210/455, 473

[56] References Cited
U.S. PATENT DOCUMENTS

| | | | |
|---|---|---|---|
| 4,493,815 | 1/1985 | Fernwood et al. | 422/101 |
| 4,948,564 | 8/1990 | Root et al. | 422/101 |
| 5,047,215 | 9/1991 | Manns | 422/101 |
| 5,116,496 | 5/1992 | Scott | 422/101 X |

*Primary Examiner*—Jill A. Johnston
*Attorney, Agent, or Firm*—Andrew T. Karnakis; Paul J. Cook

[57] ABSTRACT

A dialysis apparatus is provided including a multiwell plate, a separations membrane and a template having holes which mate with the wells. The membrane is sealed to one end of the wells by positioning the template about the outer peripheral surfaces of the wells with the membrane being frictionally held therebetween.

9 Claims, 2 Drawing Sheets

MULTIWELL TEST APPARATUS

BACKGROUND OF THIS INVENTION

This invention relates to laboratory apparatus useful in the assay of biological and biochemical reactants and is particularly concerned with multiwell apparatus capable of performing a separation process such as ultrafiltration, dialysis or reverse osmosis on a sample.

Ultrafiltration, dialysis and reverse osmosis processes all utilize a membrane to effect separation of component pars of a sample. In dialysis, for example, a sample is processed or purified by placing the sample against one surface of a semipermeable membrane and a pure solvent or solvent/solute dialysate mixture against the opposing surface of the membrane. The molecular weight cut-off (MWCO) of the membrane is selected to retain the sample, yet allow solutes having a smaller molecular size to pass through the membrane. The small molecular size solutes then diffuse throughout the membrane, driven by the concentration gradient of the small molecular size solute across the membrane. Separation of solutes in the sample is achieved by this mechanism.

In practice, a considerable part of the difficulty in performing dialysis lies in isolating the surface in contact with the sample from the opposing surface of the membrane. Cellulose acetate and regenerated cellulose dialysis membranes are notoriously difficult to seal thermally or with adhesives. It is present common practice to tie knots in tubings formed of these polymeric compositions or to utilize pinch clips in order to contain the sample.

Others clamp a flat membrane sheet between rigid plates, each containing individual receptacles. Samples are placed in the receptacles of the top plate and dialysate is circulated past the bottom plate. O-rings are utilized to seal receptacles in the top plate from one another. When utilizing this apparatus, it is difficult to attain uniform and effective pressure at the individual O-rings since pressure is not directly exerted on the individual O-rings. This lack of effective pressure application can cause undesirable across-talk between the sample receptacles. Also, since the bottom plate must press the membrane against the entire perimeter of each O-ring, the bottom receptacles form pockets dead-ended against the membrane. Air often is trapped in these pockets and prevents solvent from contacting the membrane. Even when solvent fills each pocket, dialysis is impeded because the dialysate in the pockets does not mix well with the bulk solvent.

Accordingly, it would be desirable to provide an apparatus for simultaneously dialyzing a plurality of samples while avoiding contamination between samples. In addition, it would be desirable to provide such an apparatus which assures direct contact of a separations membrane with a liquid such as a dialysate.

SUMMARY OF THE INVENTION

This invention provides a multiwell apparatus suitable for separating microliter quantities of sample. The apparatus includes a plate having a plurality of wells, open at one end and having a membrane secured across and sealed to a second end. The membrane is held in place by means of a template having a plurality of holes corresponding to the number and arrangement of the wells which registers with the wells of the plate. The holes of the template are of a size such that when it is pressed about the outside surfaces of the wells in contact with the membrane, the membrane is tightly press fit across all of the second ends of the wells. The template extends a distance along the outside surfaces of the wells past the second end of the wells so that the second end of the well is positioned flush with or away from the bottom surface of the template. In this protruded form, air blockage between the membrane surface exposed to the dialysate and the dialysate in an adjacent container is prevented.

DESCRIPTION OF SPECIFIC EMBODIMENTS

This invention provides an improved multiwell apparatus which permits separating a plurality of samples simultaneously while avoiding contamination among samples. A membrane such as a dialysis membrane, an ultrafiltration membrane or a reverse osmosis membrane is sealed to open ends of a multiwell apparatus by means of a template which secures the membrane tightly to one end of each well. The membrane on each well is positioned relative to the template so that the formation of air pockets at the membrane surface is avoided during sample separations such as dialysis.

Figure 1:
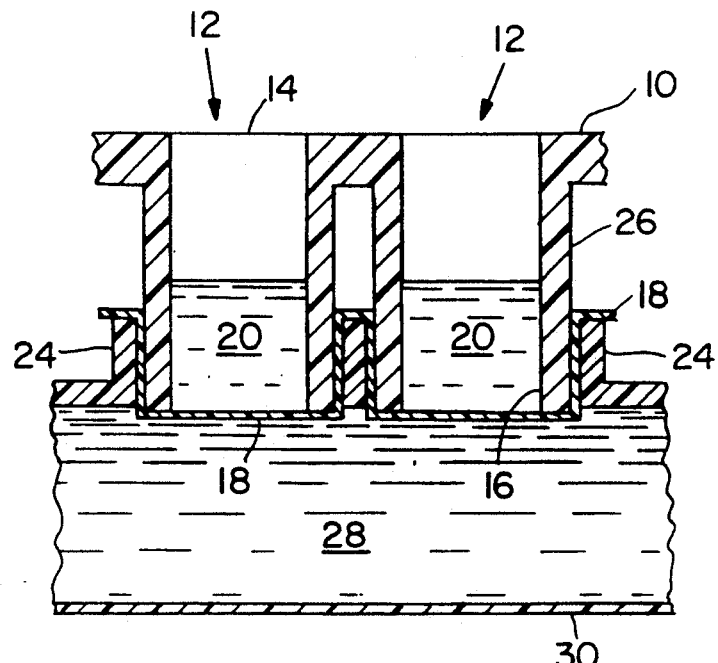
FIG. 1 is a cross sectional view of the apparatus of this invention.
Figure 2:
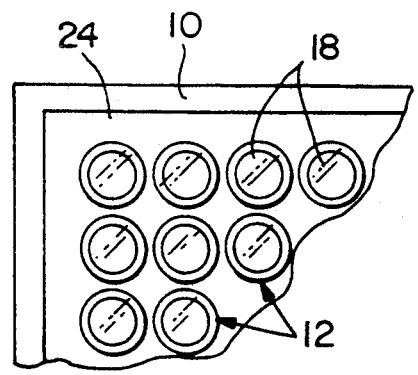
FIG. 2 is a bottom view of the apparatus of this invention.

Referring to FIGS. 1 though 3, plate 10 includes a plurality of wells 12. Each well 12 has an open end 14 and a second end 16 which is sealed by membrane 18. Sample 20 is retained within well 12. Membrane 18 is retained in sealing relationship with end 16 by means of template 24. Template 24 has a plurality of holes of a size and position so that they mate with the extension surface 26 of wells 12 adjacent end 16 with the membrane 18 frictionally held between the well surface 26 and the template. The portion of the membrane 18 which contacts end 16 is spaced apart from template 24 so that it extends into a solution 28 such as a dialysate within container 30 so that air bubbles are avoided between the membrane 18 and solution 28.

Exemplary membranes for use in dialysis for example are formed of a cellulosic such as cellulose, cellulose acetate or cellulose nitrate.

Figure 4:
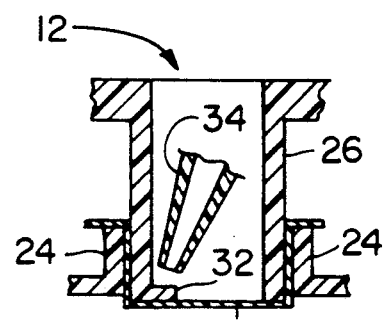
FIG. 4 is a cross-sectional view of an apparatus of this invention which includes a shelf in the well.
Figure 3:
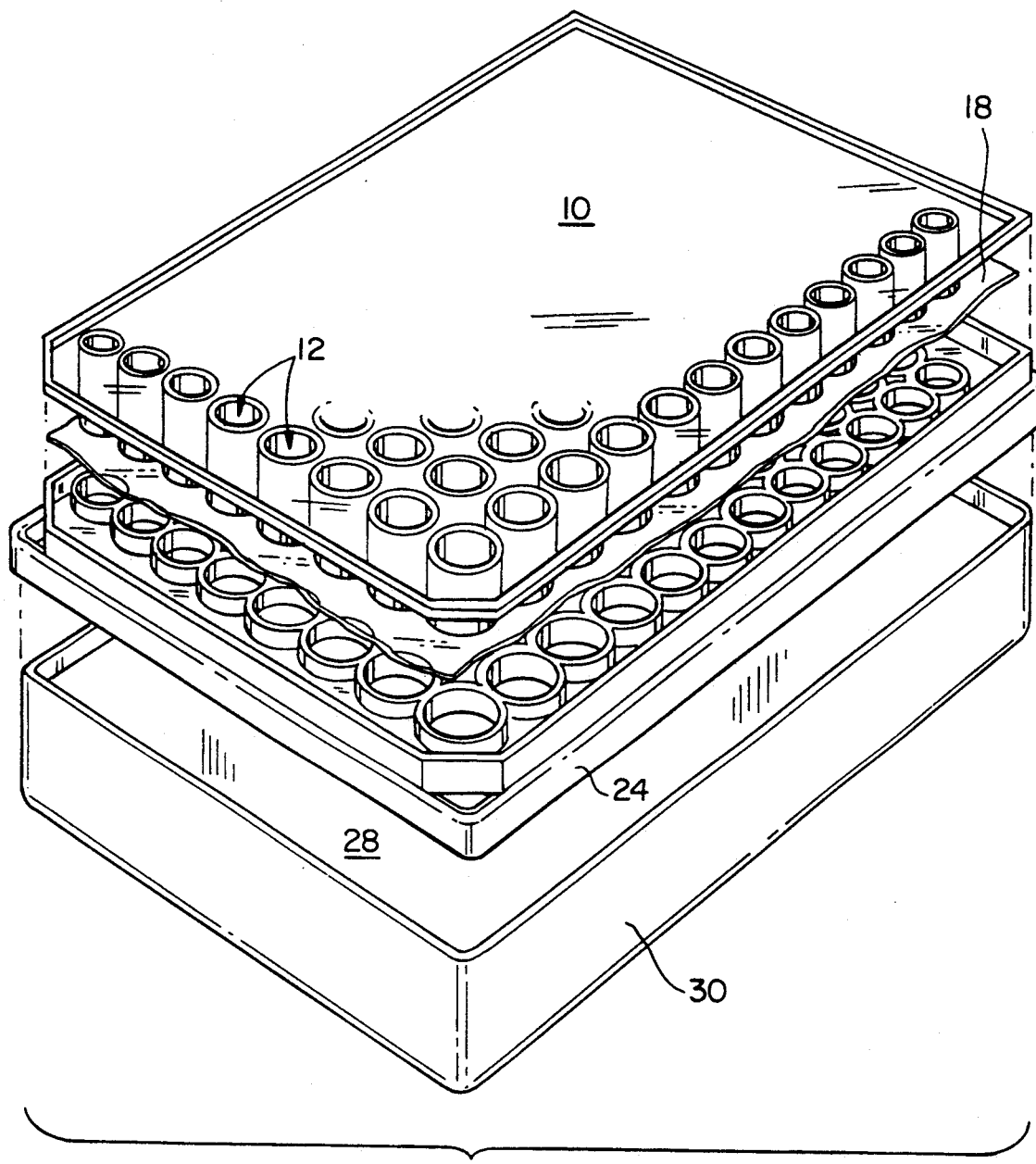
FIG. 3 is an exploded view of the apparatus of this invention.

Referring to FIG. 4, the wells 12 of this invention can include a shelf 32 at the end thereof in contact with the membrane 18. The shelf 32 is useful to position a pipette 34 for introducing or removing liquid into or from the well 26 while avoiding contact of the membrane 18 with the pipette 34. The shelf 32 materially reduces the possibility of rupturing membrane 18 with pipette 34.

We claim:
1. An apparatus suitable for separating liquid samples comprising:
   a plate having a plurality of wells, each of said wells having a first open end, a second end and an outside peripheral surface,
   a single separation membrane in sealing relationship with each of said second ends,
   and a template having a plurality of holes of a size and arrangement corresponding to said wells, said template being positioned so as to retain said membrane in sealing relationship with the second end and outside peripheral surface of each of said wells, and each second end extending through said template.

2. The apparatus of claim 1 including a container for a liquid composition in direct contact with said membrane sealed to the second end of said at least one well.

3. The apparatus of claim 1 including a shelf extending from an inner peripheral surface at said second end.

4. The apparatus of claim 1 wherein said membrane is a cellulosic.

5. The apparatus of claim 2 wherein said membrane is a cellulosic.

6. The apparatus of claim 3 wherein said membrane is a cellulosic.

7. The apparatus of claim 1 wherein said membrane is a dialysis membrane.

8. The apparatus of claim 1 wherein said membrane is a reverse osmosis membrane.

9. The apparatus of claim 1 wherein said membrane is an ultrafiltration membrane.

* * * * *